United States Patent [19]

Ullom

[11] 4,197,615
[45] Apr. 15, 1980

[54] SHORTENING DEVICE

[76] Inventor: Lawrence C. Ullom, 2353 Lumber Ave., Elm Grove, W. Va. 26003

[21] Appl. No.: 905,546

[22] Filed: May 12, 1978

[51] Int. Cl.² .................... A44B 21/00; F16G 11/12
[52] U.S. Cl. .................................. 24/68 F; 24/68 R; 24/71.3; 24/129 A; 24/129 W
[58] Field of Search ............ 24/129 A, 129 B, 129 W, 24/71.1, 71.3, 115 A, 129 R, 68 F, 68 R; 403/389; 248/328; 256/37

[56] References Cited

U.S. PATENT DOCUMENTS

| | | | |
|---|---|---|---|
| 370,346 | 9/1887 | Petty | 24/129 R |
| 1,161,559 | 11/1915 | Weigel | 24/129 B |
| 1,183,636 | 5/1916 | Garrabrant | 24/71.1 |
| 1,251,048 | 12/1917 | Kesterson | 24/71.1 |
| 1,423,211 | 7/1922 | Gushwa | 24/71.1 |
| 2,311,792 | 2/1943 | Van Valkenburgh | 24/71.3 |
| 3,204,305 | 9/1965 | Deey | 24/129 B |
| 3,438,098 | 4/1969 | Grabner | 24/71.3 |

Primary Examiner—Bernard A. Gelak
Attorney, Agent, or Firm—Peck & Peck

[57] ABSTRACT

This invention relates broadly to an apparatus for shortening wires, cables and the like without requiring the disconnection of such wires and cutting off the ends thereof to achieve the shortening. The apparatus consists generally of a sheet metal or the like shortening device which has a degree of flexibility therein by means of which the shortening function is accomplished. The wire or the like to be shortened is affixed to lugs or the like which are struck from the edge of one portion of the device and from this portion extends a tail which is bent towards the aforesaid portion and the wire is affixed to the bend which is made in this tail portion. The amount of shortening of the wire is determined by the place where the tail is bent.

5 Claims, 4 Drawing Figures

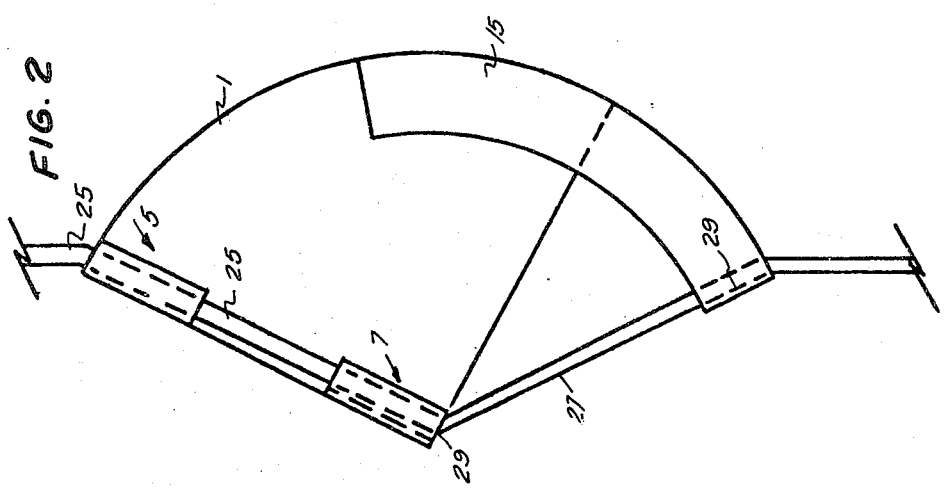
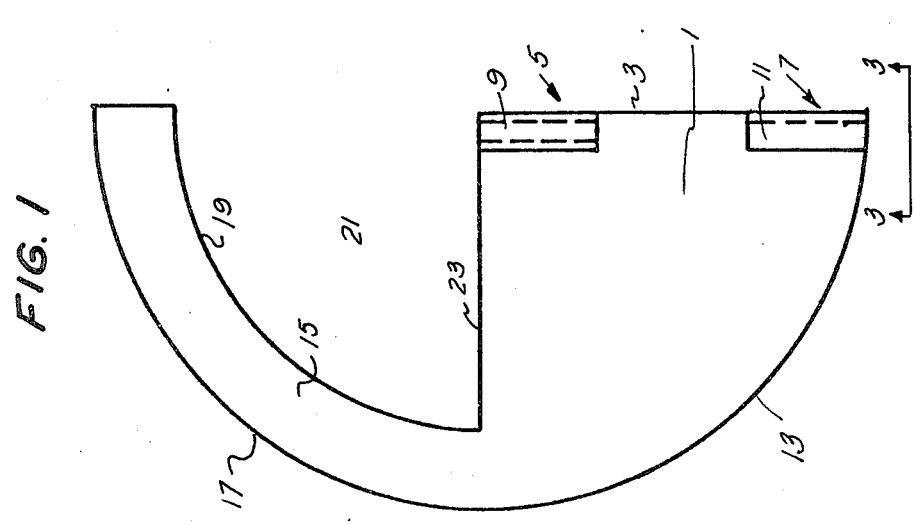
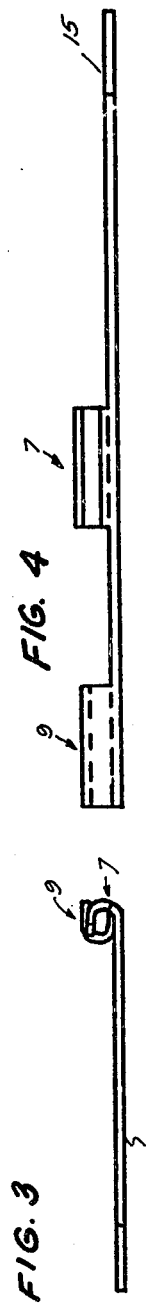

SHORTENING DEVICE

BRIEF SUMMARY OF THE INVENTION

The wire shortening device is attached to the wire, cable or the like, and after the shortening is effected the device becomes a part of the wire support. The device is preferably formed of sheet metal having a degree of flexibility for a purpose to be hereinafter described. A major body portion is provided and this major body portion is in effect a segment of a semicircle and is solid in its structure. Extending from the arcuate edge of the metal body portion I provide a tail, the outer rim of said tail assuming the curvature of the outer rim of the body portion. Means are provided on the major body portion for securing thereto the wire to be shortened and the tail is bent toward the major body portion and the wire is secured between the bend in the tail. It is to be distinctly understood that the degree of shortening of the wire is determined by where the tail is bent. In other words, the closer the tail is bent to the major body portion of the device the greater the degree of shortening will be. It should be evident from consideration of the drawings that the wire extends along the body portion in a linear path and the portion of the wire extending beyond the linear portion is fastened in the bend of the tail forming an angular stretch of wire beyond the linear stretch of wire. The angle of this stretch of wire determines the degree of shortening.

DESCRIPTION OF THE DRAWINGS

FIG. 1 is a plan view of the device prior to its attachment to a wire for the shortening thereof.

FIG. 2 is a plan view of the device with the wire or linear length attached thereto and being attached in a linear manner to the body portion and connected to the bend of the tail to produce an angular relationship between the wires.

FIG. 3 is a view taken on the line 3—3 of FIG. 1.

FIG. 4 is an elevational view of the straight edge of the major body portion and the wire extending therefrom and into the fold in the tail.

DETAILED DESCRIPTION OF THE INVENTION

The device which I have developed for shortening wire, cable or the like provides a major body portion 1 which is a segment of a semi-circular piece of galvanized metal or the like which has a certain degree of flexibility for a purpose to be hereinafter described. The major body portion provides a linear edge 3 having spaced apart lugs designated generally by the numerals 5 and 7 provided adjacent said linear edge 3. One of said lugs 9 being struck up so that its open edge faces toward the linear edge 3 while the other edge 11 is struck up from the major body portion 1 so that its open area faces in the opposite direction. The curved edge 13 of the major body portion extends from said portion and provides a tail 15 the outer edge 17 thereof following the curvature of the edge 13, while the inner edge 19 of the tail is in spaced relation to the curve of the edge 17. It will thus be apparent that a free area 21 is provided by the tail 15 and the edge 23 of the major body portion 1.

Referring particularly to FIG. 2 of the drawings it will be seen that the wire of the like 25 to be shortened is threaded through the lugs 5 and 7 and these lugs are then manipulated so that they will clamp the wire 25 in proper position. When the wire 25 has been attached as explained above to the body portion 1 with the length of wire 27 extending free of the body portion 1 the entire device is rotated clockwise which will bend the extending portion of the wire 27 as at 29 until the desired length of wire is obtained. It will be appreciated that the greater the angular relationship of the extending portion 27 of the wire to the linear portion 25 the shorter the wire will be. When the wire has been shortened to the desired length the tail 15 is bent backward towards and over the major body portion 1 as disclosed in FIG. 2 of the drawings. An extending portion 27 of the wire extends into and through the fold in the tail 15 as shown at 29.

I claim:

1. A device for shortening a normally linear length of flexible line, including a body portion, a portion of the length of said line being fixed to said body portion and extending therealong in a linear path, a portion of said line extending from one end of said length of line which is fixed to said body portion and being free thereof, an element extending from said body portion toward but spaced from said linear length of line, and extending portion of said line being fixed to said element in position thereon producing an angular relationship between the extending portion and the linear portion of the line to thereby reduce the overall length of the line.

2. A device in accordance with claim 1, wherein the element is elongated and the extending portion of the line is fixed to said elongated element at a point thereon selected to determine the degree of the outside angle between said extending portion and the linear portion.

3. A device in accordance with claim 2, wherein said elongated element is formed of a bendable material.

4. A device in accordance with claim 3, wherein said elongated element is bent at a selected point along its length and said extending portion extends through the fold formed by the bend and is fixed between the bent portions of the elongated element.

5. A device in accordance with claim 2, wherein said body portion is provided with a straight edge and a curved edge, said element provided with the curvature of said curved edge of the body portion, said line being fixed to said body portion adjacent the straight edge thereof.

* * * * *